Figure 1:
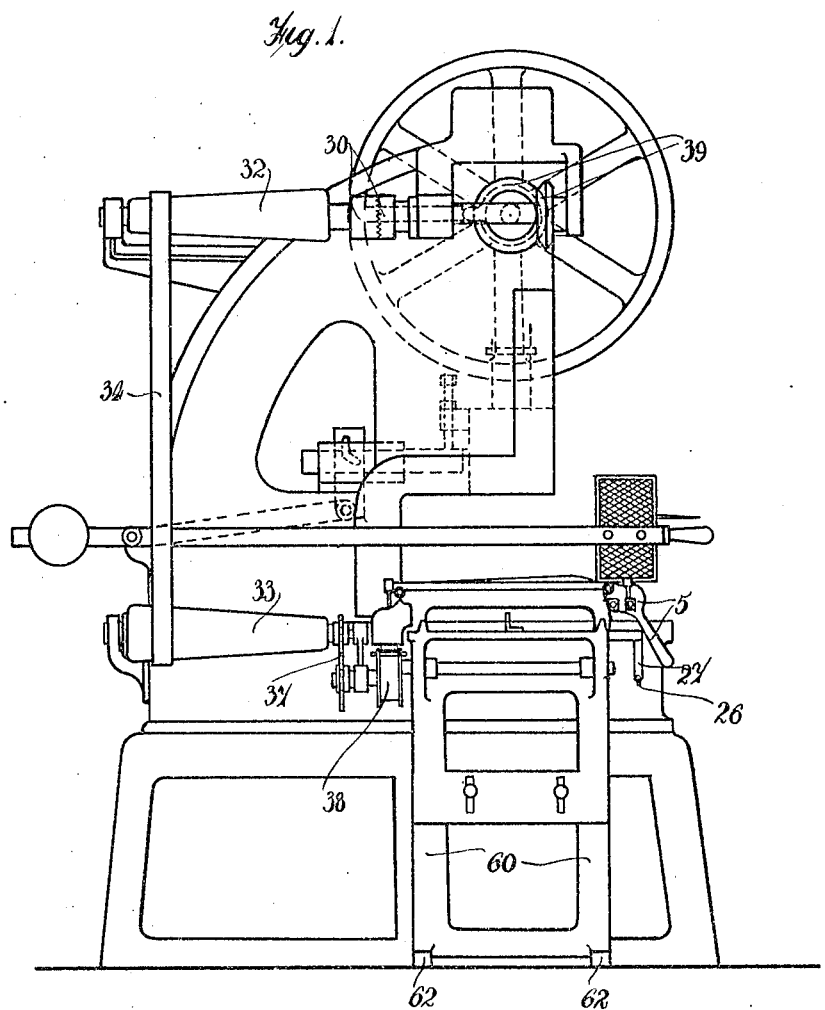

A. PEACOCK & T. H. HUTCHINSON.
WORK FEED MECHANISM FOR POWER PRESSES AND OTHER PURPOSES.
APPLICATION FILED OCT. 16, 1917.

1,292,866.

Patented Jan. 28, 1919.
5 SHEETS—SHEET 3.

A. PEACOCK & T. H. HUTCHINSON.
WORK FEED MECHANISM FOR POWER PRESSES AND OTHER PURPOSES.
APPLICATION FILED OCT. 16, 1917.
1,292,866.
Patented Jan. 28, 1919.
5 SHEETS—SHEET 4.
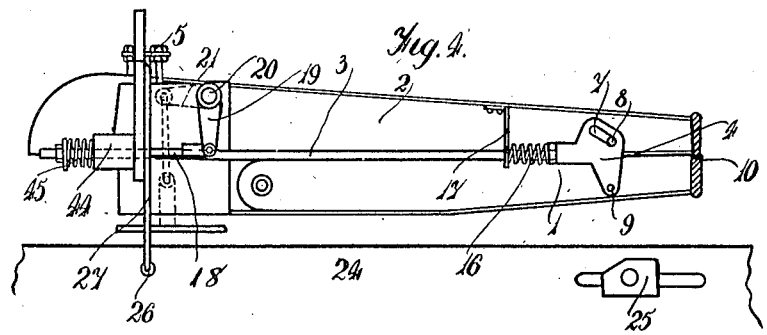
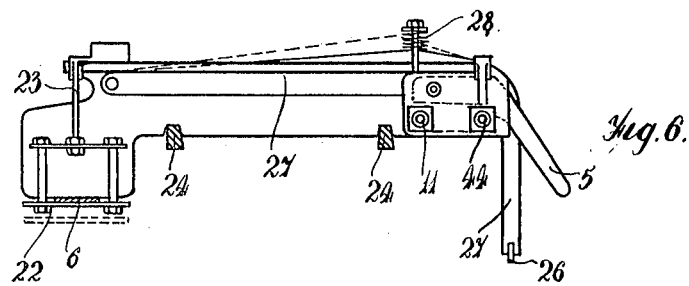
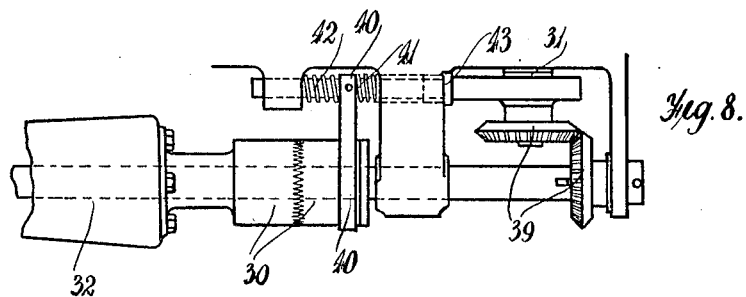
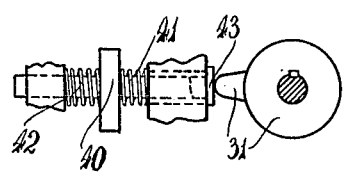
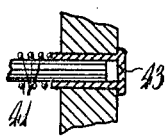
Inventors:-
Alexander Peacock and
Thomas Herbert Hutchinson,
By:- B. Singer
Atty.

A. PEACOCK & T. H. HUTCHINSON.
WORK FEED MECHANISM FOR POWER PRESSES AND OTHER PURPOSES.
APPLICATION FILED OCT. 16, 1917.
1,292,866.
Patented Jan. 28, 1919.
5 SHEETS—SHEET 5.
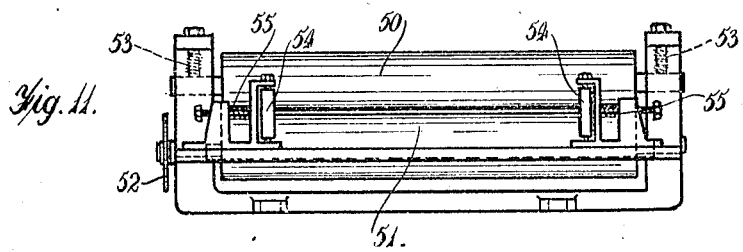
Fig. 11.
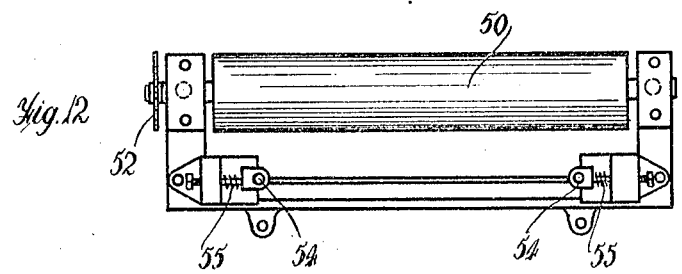
Fig. 12.
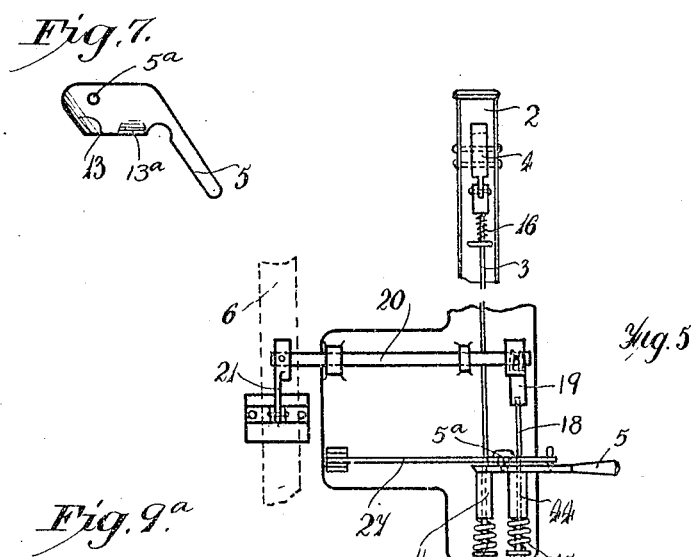
Fig. 7.
Fig. 5.
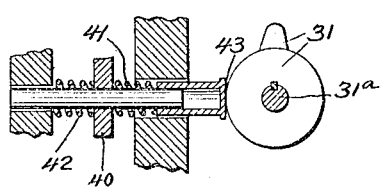
Fig. 9ª.
Inventors:-
Alexander Peacock and
Thomas Herbert Hutchinson.
By:- B. Singer. Atty.

UNITED STATES PATENT OFFICE.

ALEXANDER PEACOCK AND THOMAS HERBERT HUTCHINSON, OF BIRMINGHAM, ENGLAND.

WORK-FEED MECHANISM FOR POWER-PRESSES AND OTHER PURPOSES.

1,292,866.             Specification of Letters Patent.      Patented Jan. 28, 1919.

Application filed October 16, 1917.   Serial No. 196,893.

*To all whom it may concern:*

Be it known that we, ALEXANDER PEACOCK and THOMAS HERBERT HUTCHINSON, subjects of the King of Great Britain, and residents of Wyrley Road, Witton, Birmingham, in the county of Warwick, England, and 64 Doidge Road, Gravelly Hill, Birmingham, aforesaid, respectively, have invented new and useful Improvements in Work-Feed Mechanism for Power-Presses and other Purposes; and we do hereby declare the following to be a full, clear, and exact description of the same.

Our invention comprises improvements in work feed mechanism for power presses and other purposes and refers to that class of feed mechanism which is adapted to intermittently feed, the object of the present invention being the provision of improved feed mechanism of the kind whereby the work is automatically fed while the machine is inoperative after completing an operation or cycle of operations and the feed mechanism being inoperative while the machine is operating.

According to this invention the feed mechanism is connected to an operative part of the machine in such manner that every time the machine has performed a cycle of operations the work is fed forward a predetermined amount through the momentary engagement of a driving clutch.

The material which may be in the form of a sheet metal strip is placed upon a table or guides beneath which an endless band moves, a gripping device being provided which is adapted to grip both the strip and the band preferably under the influence of a single controlling lever or handle so that when the band is moving the work is being fed forward. Or when feeding off a roll a roller feed may be employed.

Referring to the drawings:—

Figure 1. is a side elevation of a power press fitted with feed mechanism according to this invention.

Figure 2:
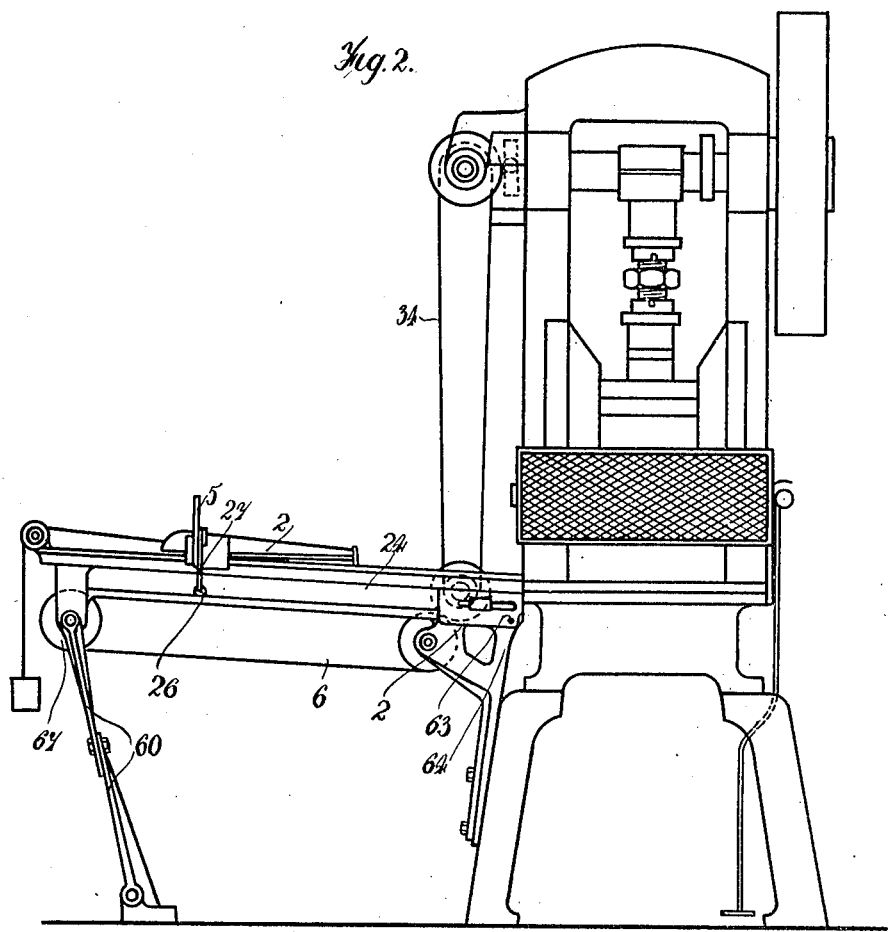

Fig. 2. is a front elevation of same.

Figure 3:
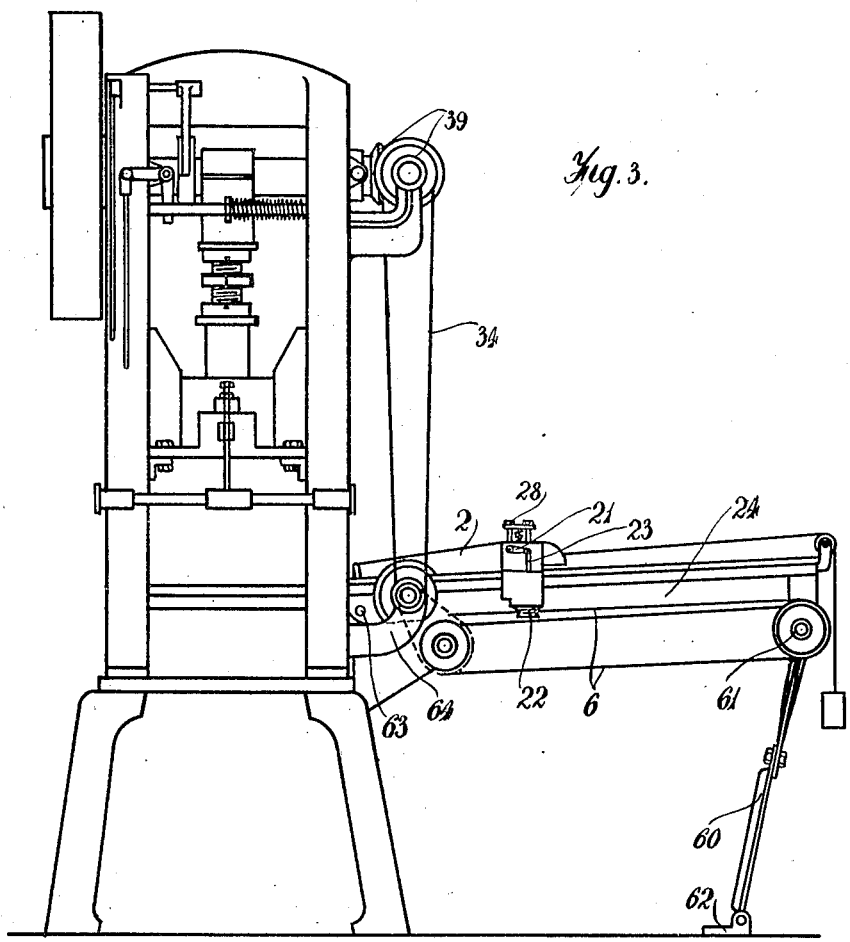

Fig. 3. is a rear elevation.

Fig. 4. is a longitudinal section of the work gripping mechanism in its closed position.

Fig. 5 is a sectional plan of same.

Fig. 6. is an end view of same in the direction of the arrow in Fig. 4.

Fig. 7. illustrates the controlling lever removed.

Fig. 8. is a plan of the intermittently operative clutch mechanism.

Fig. 9. is a detail elevation of same.

Fig. 9ª is a similar view in section.

Fig. 10. is a sectional view showing the plunger for operating the clutch.

Fig. 11. is an elevation of an alternative feed—of the roller type—and adapted more particularly for use in feeding off a roll.

Fig. 12. is a plan of same.

In carrying our invention into practice as illustrated upon the accompanying drawings at Figs. 1—10, the work gripping mechanism may conveniently comprise a pair of jaws 1, 2 adapted to grip above and below the strip one or both of these jaws being pivoted as desired. Preferably however, one jaw 1 only is pivoted and controlled by a rod 3 and cam 4 in such manner that when the rod is pulled the jaws are closed, this rod being operated by the lever or handle 5 which also controls mechanism adapted to grip the endless band 6, when the strip is fed forward with the band.

As shown the rod 3 carries the cam 4 which has an inclined slot 7 engaging a pin 8 on the jaw 2, the cam being pivoted to the jaw 1 at 9 in such manner that when the cam is pulled to the left as seen at Fig. 4 the jaws are closed to grip the work at the point 10. On the rod 3 is a sliding sleeve 11 behind which is a spring 12 this sleeve being adapted to be engaged by the lever handle 5 when said handle is lowered, the handle being provided with an incline 13 for this purpose. The function of the resiliently supported sleeve is under the influence of the handle 5 to shift the rod 3 and thereby actuate the cam 4 to close the gripping jaws, the spring 12 compensating for variations in the thickness of the metal to be gripped. When the handle is raised the jaws open under the influence of the spring 16 acting between the cam 4 and the abutment 17.

The feed is controlled by the intermittent movement of the belt 6 effected in manner hereafter explained the belt being gripped under the influence of the aforementioned lever 5. Connected to the rod 18 is a crank arm 19 on a transverse shaft 20 which also carries a second crank arm 21 which is connected to the gripper 22 by a link 23 in such manner that when the rod 18 is pulled the belt is gripped. The rod carries a sliding sleeve 44 with supporting spring 45, this sleeve being actuated by the lever handle 5 simultaneously with the sleeve 11, the handle 5 being provided with a second incline 13ª for this purpose.

The metal strip and gripping mechanism are carried by a table constituted by the member 24, and to automatically stop the feed when the end of the metal is reached a stop 25 is provided adjustably fixed to the table, said stop engaging the roller 26 on the end of the lever 27 upon which the handle 5 is pivoted at 5ª, this engagement disengaging the lever 5 from sleeves 11 and 44, against the action of the spring 28.

The movement of the band 6 is controlled by a clutch 30 and gearing, the clutch being engaged under the influence of a cam 31 mounted upon a continuously rotating part of the press so that during a portion of each rotation of the cam the clutch is engaged to advance the work while during another and greater part the clutch is disengaged and the work remains stationary.

The gearing may conveniently take the form of a pair of cones 32, 33 with a connecting and driving band 34 with a suitable striking mechanism so that a movement of the band in the direction of the axes of the cones will vary the speed of the driving pulley relatively to the main part of the machine, the driven cone 33 being connected by sprocket wheels and chain 37 to a pulley 38 which carries the feed band 8. As shown the clutch is driven off the shaft 31ª carrying cam 31 by bevel gears 39.

The movable member of the clutch 30 has an arm 40 having a spring 41 on one side and a spring 42 on the other side, the strength of these springs being so proportioned as to normally keep the clutch in its disengaged position. Between the spring 41 and cam 31 is a plunger sleeve 43 which under the influence of the cam and through the intermediary of the spring 41 serves to put in the clutch; the resiliency of the spring preventing injury to the clutch teeth in the event of the tops of the teeth abutting against each other without driving engagement.

Means may be provided so that when the work holder reaches a predetermined position as at the end of the work the clutch will be automatically disengaged and the feed of the work arrested instead of the connection between the work and band being automatically disengaged.

In Figs. 11 and 12 a modified form of feed mechanism is shown adapted for use when feeding a roll of metal instead of a flat strip. A pair of friction rollers 50, 51 are provided, one being intermittently driven by a sprocket wheel 52 from the clutch mechanism previously shown. The upper roll is resiliently controlled by the springs 53 which compensate for variations in the thickness of the metal passing between the rolls; while lateral and adjustable guides are provided in the form of the rollers 54 supported by springs 55.

The table 24 upon which the work is mounted is adjustable in height so as to compensate for variations in the effective height of the tools; such means conveniently may take the form of a support 60 pivoted at the end of the table at 61 and provided with a pivoted foot 62 also with pins and slots for varying the height or length of the support. The table may be conveniently pivotally supported at 63 adjacent to the tools so that it may fold upwardly if required, and this end of the table may also be adjustable vertically through the medium of the bracket 64. The table may also have a pivoted extension in the direction of the tools serving to guide the material to the tools.

By this means the work is automatically and intermittently fed into the machine as is required to successively bring the material beneath the tools ready for each operation of the press.

Feed mechanism according to this invention is particularly applicable for use in connection with the controlling mechanism according to our prior British application No. 16903 A. D. 1916, while the guard 66 may be according to our prior British Patent No. 22104 A. D. 1914.

What we claim then is:—

1. In work feed mechanism for power presses and other purposes the combination of a work gripper; a driving clutch; means for transmitting the movements of said driving clutch to said work gripper; a spring for normally retaining the said clutch in its disengaged position; and a cam for engaging the clutch, for the purpose specified.

2. In work feed mechanism for power presses and other purposes the combination of a work gripper; a driving clutch; means for transmitting the movements of said driving clutch to said work gripper; a pair of oppositely acting springs controlling said clutch and normally holding it in its disengaged position; a cam; and a plunger intermediate between the cam and spring and serving to compress the spring and engage the clutch, substantially as set forth.

3. In work feed mechanism for power presses and other purposes the combination of a work gripping device embodying in combination a fixed jaw; a movable jaw pivoted to said fixed jaw; a jaw closing member pivoted to one jaw and connected to the other jaw by a pin and inclined slot; a rod connected to said jaw closing member; and a pivoted handle serving to displace said rod and thereby operate the jaw closing member.

4. In work feed mechanism for power presses and other purposes the combination of a fixed jaw; a movable jaw pivoted to said fixed jaw; a jaw closing member pivoted to one jaw and connected to the other jaw by a pin and inclined slot; a rod connected to said jaw closing member; a spring supported abutment member on said rod; and a pivoted handle having an inclined portion adapted to engage said abutment member, for the purpose specified.

5. In work feed mechanism for power presses and other purposes the combination of an endless band; a work gripper adapted to be connected to said band; a driving clutch controlling the movement of said band; means for momentarily engaging said clutch for the purpose of driving the band and advancing the work gripper; a band gripper; a rod connected thereto; and a pivoted handle which actuates the rod and causes the band gripper to grip the band, for the purpose specified.

6. In work feed mechanism for power presses and other purposes the combination of an endless band; a work gripper adapted to be connected to said band; a driving clutch controlling the movement of said band; means for momentarily engaging said clutch for the purpose of driving the band and advancing the work gripper; a band gripper; a rod connected thereto; a spring supported abutment member on said rod; and a pivoted handle having an inclined part adapted to engage with said abutment member, for the purpose specified.

7. In work feed mechanism for power presses and other purposes the combination of an endless band; a work gripper adapted to be connected to said band; a driving clutch controlling the movement of said band; means for momentarily engaging said clutch for the purpose of driving the band and advancing the work gripper; a band gripper; a rod connected thereto; a fixed jaw for gripping the work; a movable jaw co-acting with said fixed jaw; a jaw closing member pivoted to one jaw and connected to the other jaw by a pin and inclined slot; a rod connected to said jaw closing member; and a pivoted handle serving to actuate both of said rods to grip the band and work.

In testimony whereof we affix our signatures.

ALEXANDER PEACOCK.
THOMAS HERBERT HUTCHINSON.

Copies of this patent may be obtained for five cents each, by addressing the "Commissioner of Patents, Washington, D. C."